United States Patent Office 2,795,928
Patented June 18, 1957

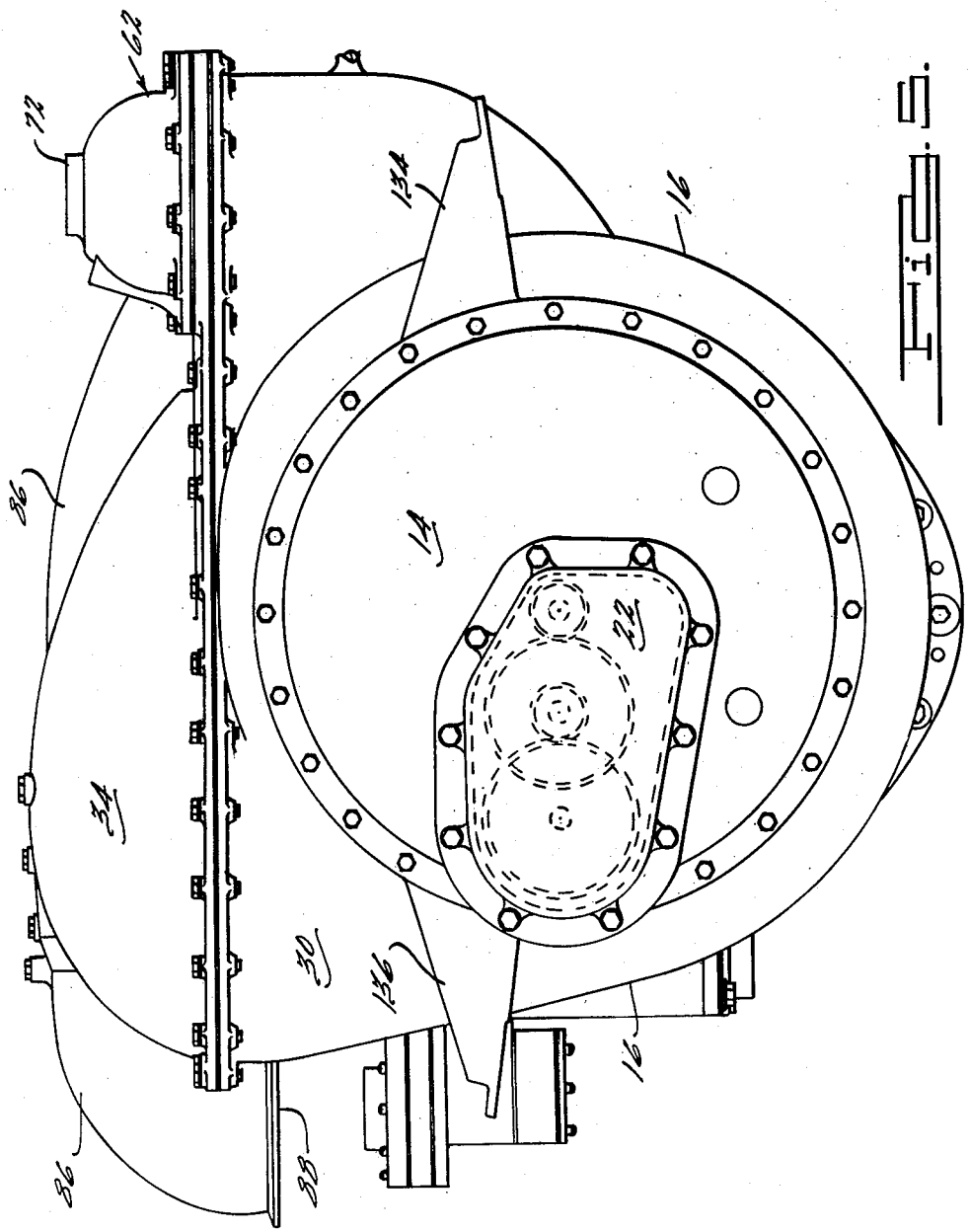

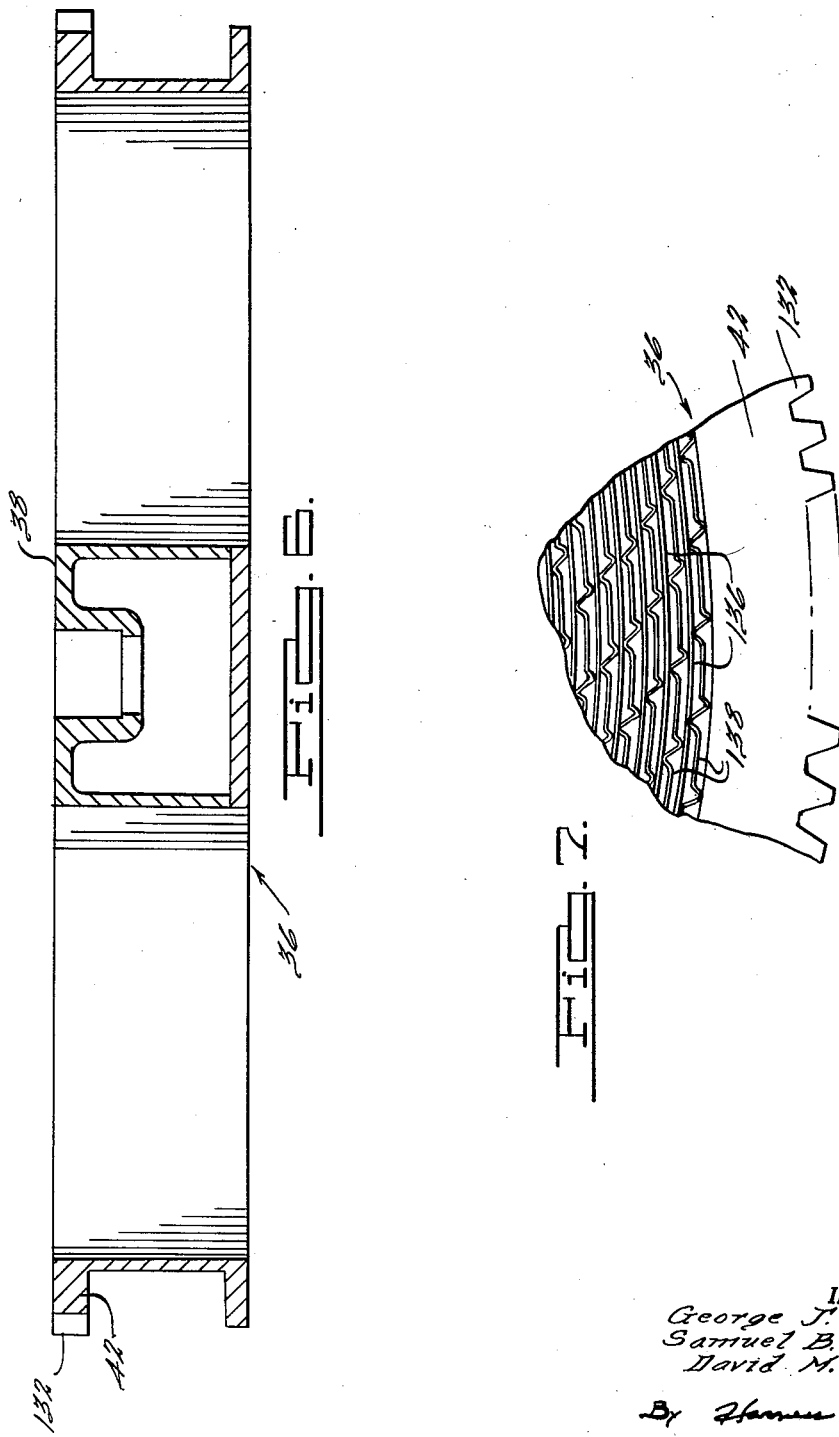

2,795,928

ARRANGEMENT OF COMPONENT ELEMENTS OF A GAS TURBINE POWER PLANT

George J. Huebner, Jr., Bloomfield Hills, Samuel B. Williams, Birmingham, and David M. Borden, Huntington Woods, Mich., assignors to Chrysler Corporation, Highland Park, Mich., a corporation of Delaware Application October 29, 1953, Serial No. 389,094

10 Claims. (Cl. 60—39.16)

This invention relates to gas turbine power plants and more particularly to a new and improved arrangement of the component elements thereof which includes a turbine assembly, a burner for supplying motive gases to the turbine assembly, a compressor for supplying a suitable continuous combustion supporting medium under pressure to the burner and a regenerator unit for heating the combustion supporting medium prior to its entry into the burner.

It is well known in the art to employ the above elements in an operative association as a power plant. However, heretofore no successful arrangement has been derived which would adapt the power plant for use in an engine compartment of an automotive vehicle for powering the same.

The provision of a gas turbine power plant having the compactness and physical overall dimensions required of an automotive power plant being a primary object of the present invention, another object is to provide a gas turbine power plant according to the preceding object which will provide for maximum operating efficiency.

Another object of the present invention is to provide a gas turbine power plant suitable for powering an automotive vehicle having the component elements thereof strategically arranged to adapt the unit for installation in a conventional vehicle engine compartment and for avoiding interference with the other vehicle components.

Another object of the present invention is to provide a gas turbine power plant having a regenerative cycle whereby the turbine exhaust gases are utilized to increase the temperature of the air entering the burner.

Another object of the present invention is to provide a gas turbine power plant according to the preceding object wherein the regenerator structure is strategically arranged in a convenient position to adapt the power plant for automotive vehicle installations.

Another object of the present invention is to provide a gas turbine power plant having a regenerative cycle wherein the regenerator structure is located internally of the gas turbine housing and situated in close proximity to the expanding combustion gases and to the compressed air discharged from the compressor unit so as to provide a smooth gas flow pattern with a minimum of variation in the direction thereof.

Other objects will become apparent from the following description and the accompanying drawings wherein:

Figure 5 is an end view of the power plant of Figure 1 showing an external view of the housing;

Figure 6 is a sectional view of the regenerator unit for the power plant taken along a diametral plane; and Figure 7 is a detail sectional view of a portion of the core of the regenerator of Figure 6.

Figure 1:
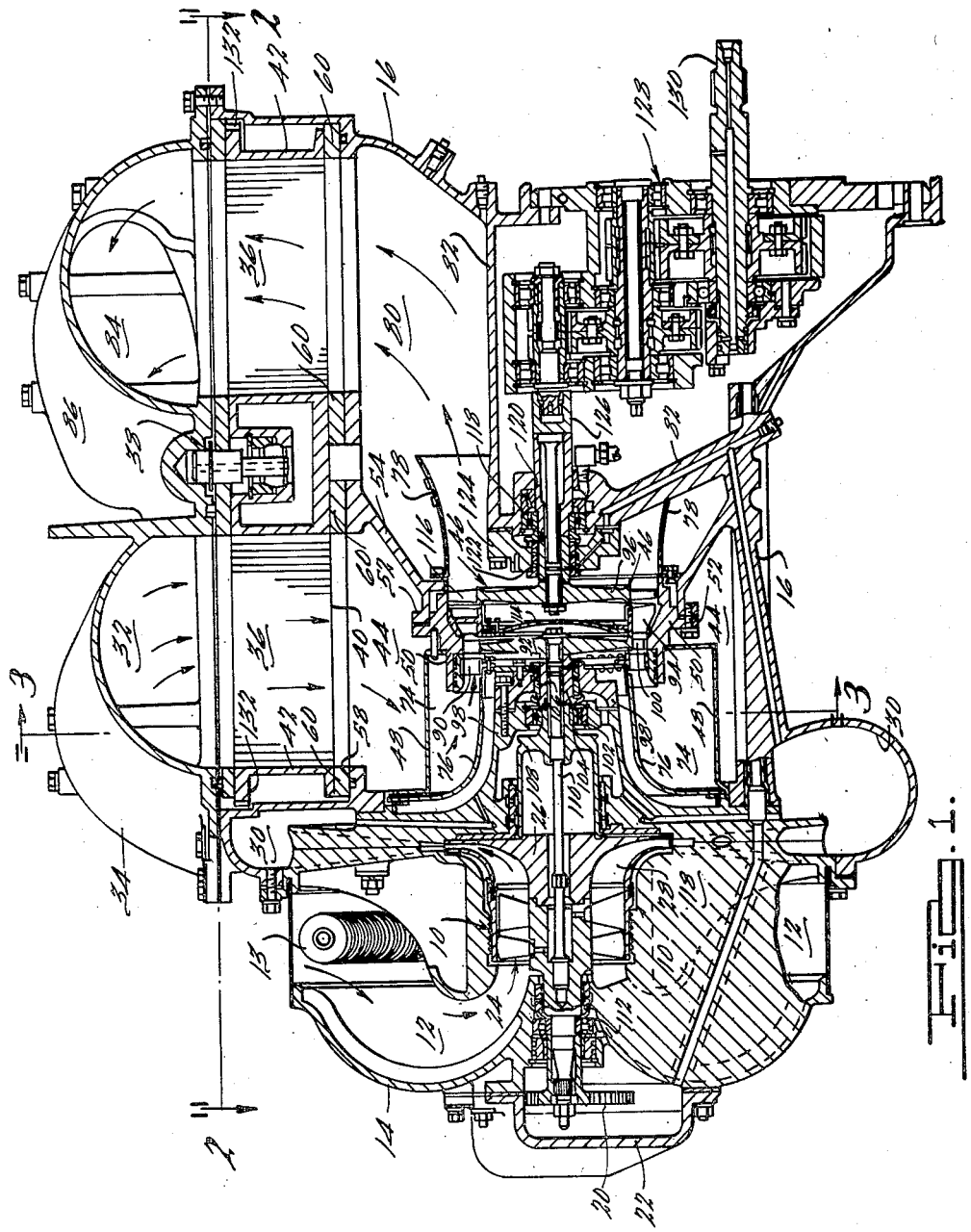
Figure 1 is a composite assembly view of the gas turbine power plant of the present invention.

Having reference first to Figure 1, a centrifugal compressor is generally designated by the numeral 10. A circular air intake passageway is provided at 12 on the upstream side of the compressor 10 and it comprises an outwardly diverging air conduit having a reverse curve configuration which is partly defined by the outer plate 14. A finned tube type of oil cooler may be provided at 13, if desired, in the intake passageway. Plate 14 is secured to the gas turbine housing proper, which is designated by numeral 16, by means of suitable supporting ribs 18. A fuel control and accessory drive gear is shown in Figure 1 at 20 and it is covered by a suitable cover plate 22 bolted to the plate 14.

The converging air intake passageway 12 extends axially at the radially inward portion thereof and is effective to conduct intake air to the mouth of a bladed inducer assembly 24 for the centrifugal compressor unit 10. A rotor portion 26 for the compressor unit 10 receives the intake air from the inducer 24 and discharges the same radially from the blades 28 as the compressor assembly 10 revolves about its geometric axis. The discharged air is then received in the intake portion of a spiral diffuser structure shown at 30.

The diffuser 30 comprises a chamber which is defined by a portion of the housing 16 and which progresses spirally about the axis of the compressor 10 with an increasing cross sectional area. The diffuser 30 then discharges into the domed chamber 32 formed on the top portion of the power plant.

Figure 3:
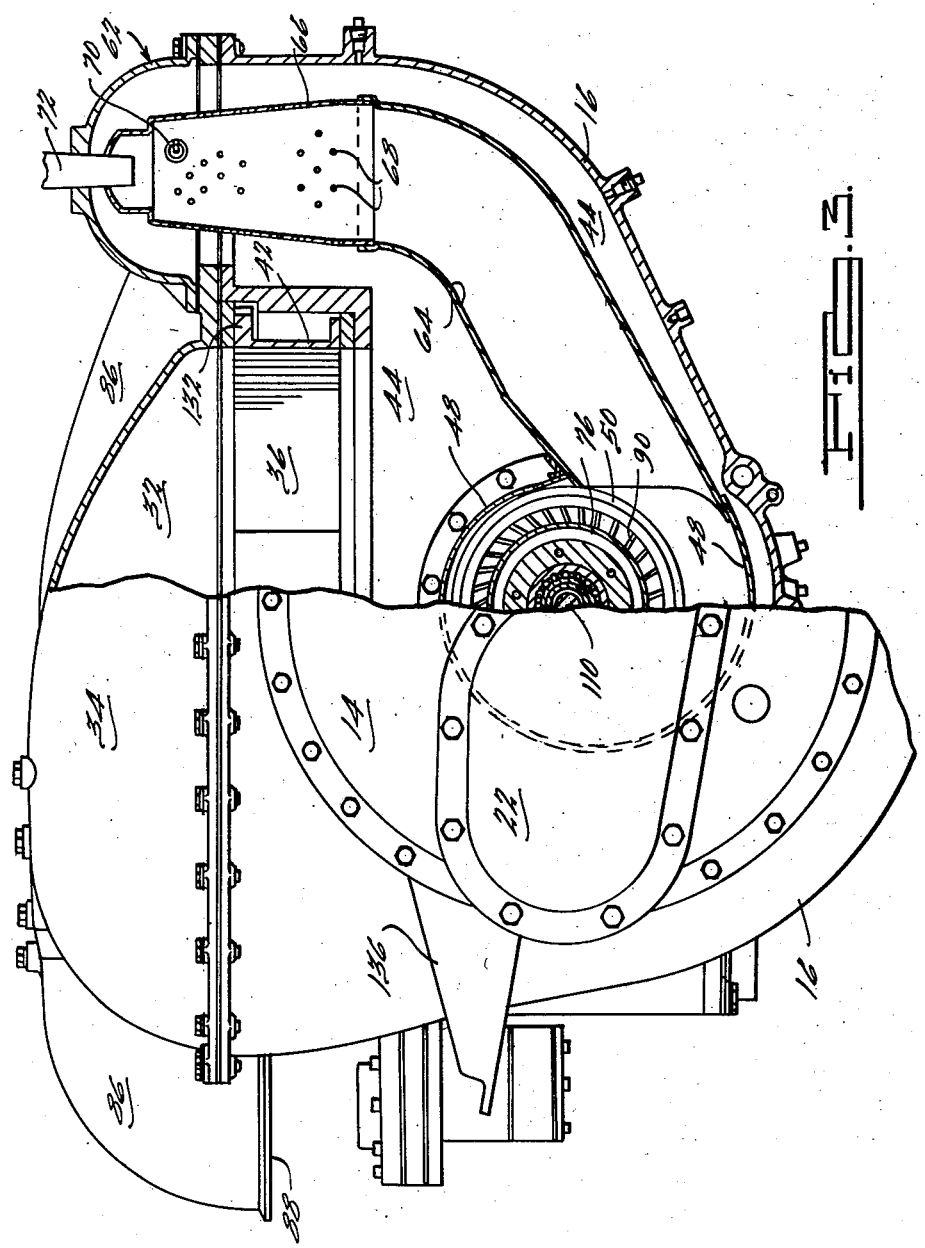
Figure 3 is a view, partly in section, of the burner for the power plant of Figure 1 and is taken along the line 3—3 of Figure 1.
Figure 4:
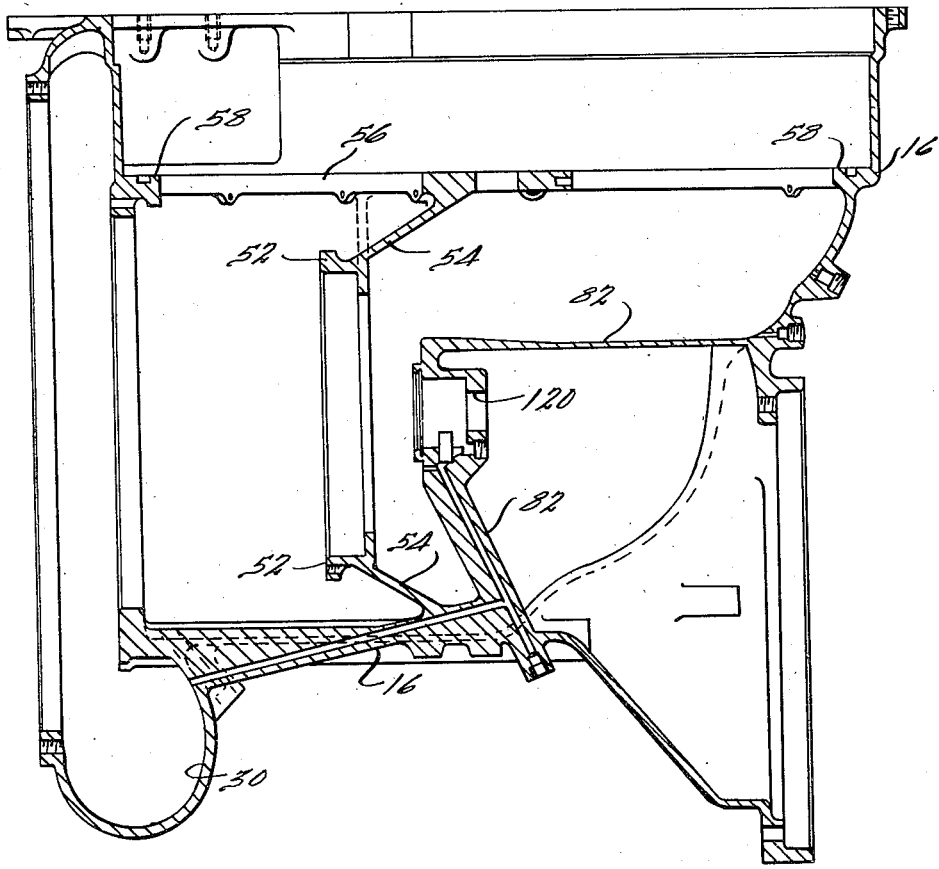
Figure 4 is a detail view of a portion of the cast housing for the power plant of Figure 1.

The cover defining the chamber 32, which is designated in Figure 1 by numeral 34, may also be seen in Figure 3 wherein the relative size of the same can be readily ascertained. The chamber 32 opens directly into a segmental portion of a rotary regenerator 36 which is adapted to revolve about a suitable hub 38 in a horizontal plane.

The regenerator 36 comprises an internal core structure 40 which is provided with transverse passages extending therethrough and a rim member 42 which surrounds the structure 40.

The air passes from the chamber 32 into a chamber shown at 44 below the regenerator 36. As seen in Figure 1 and in Figure 3, the chamber 40 surrounds the turbine structure 46 which will be described later in more particular detail. The chamber 44 is partly defined by a suitable stainless steel baffle 48 which extends axially from the wall of the diffuser 30 to a substantially annular turbine casing member 50, said casing member 50 being bolted to an annular flange 52 formed at the edge of a diverging portion 54 of the cast housing 16.

Figure 2:
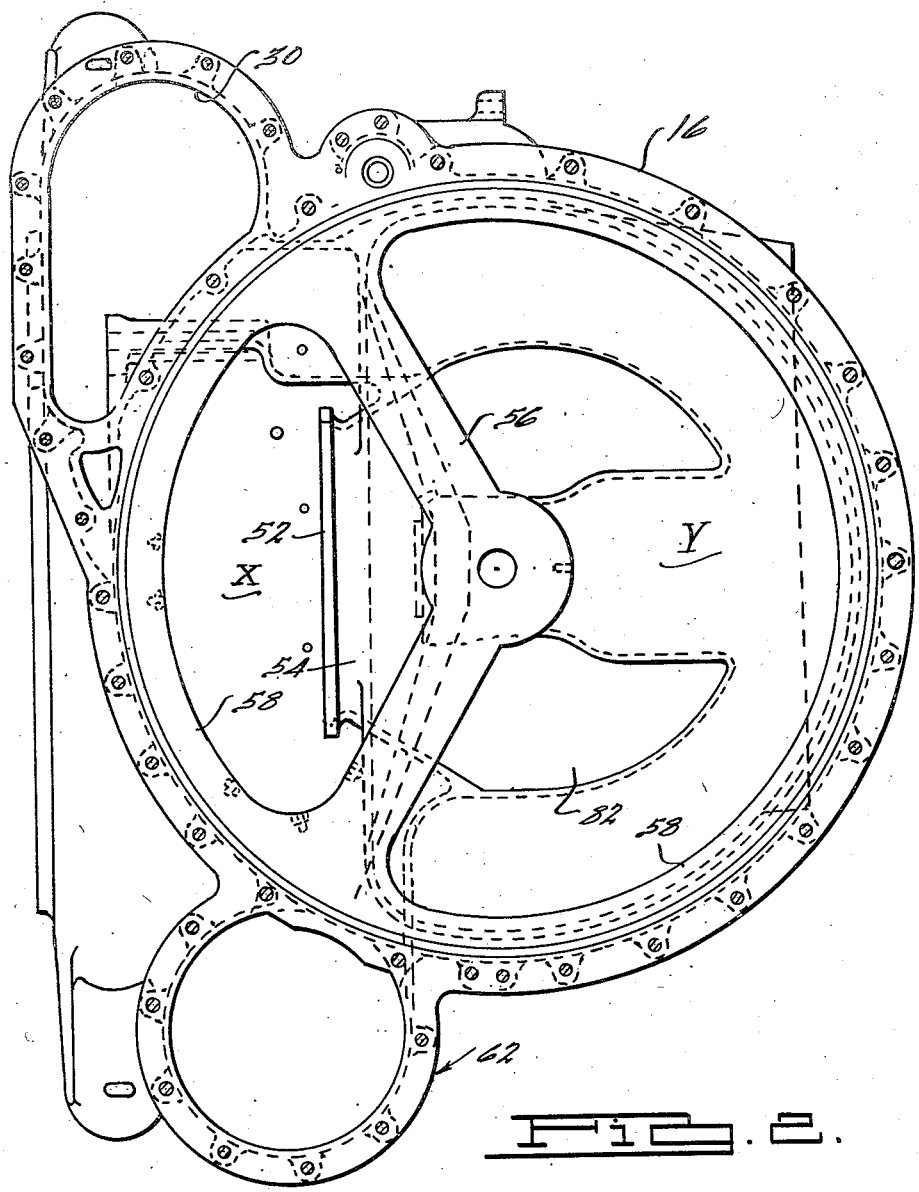
Figure 2 is a view of the top of the power plant taken along the section line 2—2 of Figure 1.

The chamber 44 is in communication with the passages in the regenerator 36 over a segmental portion of the regenerator. This segmental portion is shown at X in Figure 2 and is defined by the radial casting portions 56. The portions 56 extend from a central hub to a circular shoulder 58, as best seen in Figure 2, which encircles the outer periphery of the casting 16 adjacent the rim 42 of the regenerator 36. A suitable seal 60 is adapted to seat upon the shoulder 58 and the casting portion 56.

Referring next to Figure 3, the compressed air which passes through the regenerator 36 into chamber 44 is conducted up into the burner shown generally at 62. The burner 62 includes a burner tube 64 which forms an extension of the baffle 48 and causes the air to pass around a suitable burner cone 66 which may be provided with intake apertures 68 and an ignition means 70. A suitable fuel injection means is shown schematically at 72.

After the combustible mixture is ignited and burned in the burner cone the hot expanded combustion gases pass down through the burner tube 64 into the annular space 74 defined by the baffle 48 and another baffle 76 best seen in Figure 1. The cross sectional area of the space 74 progressively decreases as the combustion gases enter the same and travel clockwise therein about the axis as viewed in Figure 3.

The gases then pass axially through the various blade stages of the turbine units into the throat of a diverging baffle 78 from which the gases are exhausted into chamber 80 shown in Figure 1. Chamber 80 surrounds and is partly defined by transmission housing portion 82 of the casting 16.

The chamber 80 is exposed over the area Y, as seen in Figure 2, to another segmental portion of the regenerator 36 through which the exhaust gases in chamber 80 may pass. The gases which pass through the portion Y of the regenerator 36 are received in exhaust chamber 84 located on the top of the gas turbine unit. The cover which defines chamber 84, and which is shown at 86, is adapted to conduct the exhaust gases to a suitable exhaust port shown in Figures 3 and 5 at 88. A suitable exhaust pipe, not shown, may be attached to the exhaust port to conduct the exhaust gases to a convenient place.

Referring again to Figure 1, it is seen that the turbine structure 46 comprises in series a stator blade cascade 90, a primary turbine wheel 92, a second stator blade cascade 94 and a secondary or output turbine wheel 96. The stator blades 90 are secured to an axially extending casting portion 98 of the diffuser structure 30.

The primary turbine wheel 92 carries peripherally mounted blades 100 adjacent the stator blades 90 and is journalled in the casting portion 98 by suitable bearings 102. The hub 104, which is formed separately from the wheel 92 proper, is provided with suitable sealing means 106 about the periphery thereof. A cylindrical spacer member 108 is interposed between the hub 104 and the rotor 26 of the compressor 10. A shaft 110 is adapted to retain the compressor rotor 26, the inducer 24, spacer 108, hub 104 and wheel 92 in axially stacked relationship. A second bearing 112 is provided to furnish end support for the above stacked assembly.

The fuel control and accessory drive 20, as seen in Figure 1, is powered by means of a positive connection with the hub of the inducer 24.

The second set of stator blades 94 are secured within suitable inserts in the casing member 50 and held from inward radial movement by the plate 114.

The secondary turbine wheel carries peripherally mounted blades 116 and is journalled at 118 within an aperture 120 formed in the housing portion 82 of the casting 16. Suitable sealing means may be provided for the turbine hub at 122 and retained within an adaptor 124 which is secured to the casting portion 82.

The hub of turbine wheel 96 is positively connected to an input shaft 126 for a reduction gear transmission shown generally by means of numeral 128. The transmission power output shaft is shown at 130.

The regenerator 36 is peripherally surrounded by an upward extension of casting 16. The rim 42 of the regenerator 36 is provided with a ring gear 132 for rotating the regenerator about its central axis. A power takeoff from the drive 20 may be provided for supplying a driving effort to the ring gear 132.

Suitable brackets 134 may be provided, as shown in Figure 5, for the purpose of installing the power plant in the vehicle engine compartment. Resilient mounts are preferably used in conjunction with the mounting brackets.

It has been found to be highly desirable to provide the casting 16 with a lining which consists of 1/32 inch sheet metal and a 3/8 inch layer of dimpled aluminum sheets beneath the sheet metal. A portion of the air discharged from the compressor may be directed into the space occupied by the aluminum sheets to provide additional cooling.

One of the unique features of the present embodiment of the invention resides in the regenerator and the associated structure. The regenerator itself is strategically positioned so that the air in the diffuser portion may enter the segmental portion X with a minimum amount of deviation in direction. Further, the position is such that the turbine exhaust gases are located in close proximity to the segmental portion Y. It is only necessary for the turbine exhaust gases to turn in a 90 degree direction before entering the passages of the regenerator.

The design of the present embodiment is such that it may be readily adapted to be used in automotive vehicles. The space at the bottom of the power plant between the diffuser 30 and the casing for the transmission 120 conveniently provides space for the usual automotive steering linkage. Also, the power output shaft 130 for the transmission 128 is sufficiently low so that the usual vehicle drive shaft may be positioned conveniently below the vehicle chassis.

The air intake 12 is effective, by virtue of its reverse curve configuration, to somewhat suppress or muffle any high pitch noises that may be produced by the compressor unit. If desired, a suitable lining, such as fibre glass board, may be provided inside the plate 14 to further dampen the acoustic disturbances created by the compressor.

The position of the regenerator unit is such that the same may be conveniently serviced when the power plant is installed in the vehicle. In addition, the overall physical dimensions of the unit are kept to a minimum by virtue of the fact that the regenerator itself is placed inside the unit and in close proximity to the compressor discharge and the turbine discharge. This feature has been accomplished without causing the gas flow path to assume a complex shape with frequent reversals in direction and without unduly increasing the length of the gas conduits or the distance required for the movement of the gases to and from the regenerator.

The actual construction of the regenerator core may be of the type illustrated in Figure 6 which consists of a series of plain stainless steel plates 136 and a series of corrugated stainless steel plates 138 wound alternately about the hub 38 and surrounded by the rim member 42. The alternately stacked sheets 136 and 138 may be copper brazed so as to produce an integral brazed unit having axial passages therethrough.

As the regenerator unit 36 is revolved about its axis, the hot exhaust gases pass through one portion Y thereof and heat the stainless steel layers of the regenerator to a relatively high temperature (e. g. 1200° F.). As the regenerator continues to rotate, the hot segmental portion is brought into contact with the air discharged from the compressor unit, which may be at a temperature of approximately 400° F. immediately after it is compressed, and heats the same as it passes through the regenerator passages in a direction opposite from the direction of travel of the turbine exhaust gases. The temperature differential for the turbine exhaust gases as they pass through the portion Y and the temperature differential for the compressed air as it passes through the portion X may be approximately 500 to 600° F. for a unit of the type herein disclosed. Consequently, the energy required to raise the temperature of the working gases in the burner is reduced and the overall power plant efficiency is correspondingly increased.

Another unique feature of the present power plant design resides in the elimination of many of the heat dissipation problems by virtue of the fact that the regenerator 36 and the chambers 22 and 84 are at a relatively cool temperature (e. g. 400 to 500° F.). The area covered by the structure represents a considerable percentage of the total area of the cast housing for the power plant as a whole.

Another advantage of the present embodiment resides in the reduction in weight which comes about by the combining of the regenerator and the power plant proper into a composite assembly.

Although one preferred embodiment of the invention has been specifically disclosed, it is understood that the invention is not limited thereto as many variations will be readily apparent to those skilled in the art and the invention is to be given its broadest possible interpretation within the terms of the following claims.

We claim:

1. A gas turbine power plant comprising a housing, a multiple stage turbine unit including first and second stage rotary turbine elements rotatably mounted within said housing, a compressor unit including a rotor rotatably mounted within said housing and drivably connected to said first stage turbine element, said rotor and said turbine elements being coaxially disposed, a volute diffuser formed in said housing about said rotor including air intake porting of reduced area situated adjacent the periphery of said rotor, said volute diffuser having a terminal portion of relatively large cross sectional area disposed at a radially spaced location at the upper portion of said powerplant, a circular rotary regenerator rotatably mounted in a horizontal plane in the upper portion of said power plant housing, said regenerator including a pervious matrix with one portion thereof disposed transversely across the terminal portion of said diffuser, a fuel combustion chamber positioned within said housing at one side thereof in a vertical transverse plane closely adjacent said compressor rotor and said diffuser, first baffling structure for conducting air from the terminal portion of said diffuser to said combustion chamber, said first baffling structure being comprised at least in part by said housing, other baffling structure for conducting gaseous fuel combustion products from said combustion chamber, said other baffling structure being positioned substantially in the vertical plane of said combustion chamber and partly defining a spiralled chamber between said combustion chamber and said first stage turbine element, said housing including internal wall structure defining an annular gas passage means for conducting combustion gases axially through said turbine stages, said annular gas passage being in communication with said spiralled chamber, said wall structure further being effective to direct the exhaust gases passing through said turbine stages through another portion of said regenerator matrix, means for rotating said regenerator, and means for drivingly connecting said second stage turbine element to a power absorbing member.

2. A gas turbine power plant comprising a housing, a multiple stage turbine unit including first and second stage rotary turbine elements rotatably mounted within said housing, a compressor unit including a rotor rotatably mounted within said housing and drivably connected to said first stage turbine element, said rotor and said turbine elements being coaxially disposed, a volute diffuser formed in said housing about said rotor including air intake porting of reduced area situated adjacent the periphery of said rotor, said volute diffuser having a terminal portion of relatively large cross sectional area disposed at a radially spaced location at the upper portion of said power plant, said terminal portion being defined by a removable cover secured to the top portion of said power plant, said cover forming a portion of said power plant housing, a circular rotary regenerator rotatably mounted in a horizontal plane in the upper portion of said power plant housing, said regenerator including a pervious matrix with one portion thereof disposed transversely across the terminal portion of said diffuser, a fuel combustion chamber positioned within said housing at one side thereof in a vertical transverse plane closely adjacent said compressor rotor and said diffuser, first baffling structure for conducting air from the terminal portion of said diffuser to said combustion chamber, said first baffling structure being comprised at least in part by said housing, other baffling structure for conducting gaseous fuel combustion products from said combustion chamber through said multiple stage turbine elements, said other baffling structure being positioned substantially in the vertical plane of said combustion chamber, said housing including wall structure for directing exhaust gases from said turbine stages through another portion of said regenerator matrix, means for rotating said regenerator, and means for drivably connecting said second stage turbine element to a power absorbing member including a speed reduction transmission, and an exhaust passage means partly defined by said removable cover for conducting exhaust gases away from said other regenerator matrix portion, said regenerator being readily accessible from the exterior of the power plant upon removing said removable cover.

3. A gas turbine power plant comprising a housing, a multiple stage turbine unit including first and second stage rotary turbine elements rotatably and centrally mounted within said housing, a compressor unit including a rotor rotatably mounted within said housing and drivably connected to said first stage turbine element, said rotor and said turbine elements being coaxially disposed, a volute diffuser formed in said housing about said rotor including air intake porting situated adjacent the periphery of said rotor, said volute diffuser having a terminal portion of relatively large cross sectional area disposed at a radially spaced location at the upper portion of said power plant, said terminal portion being defined by a removable cover secured to the top portion of said power plant, said cover forming a portion of said power plant housing, a circular rotary regenerator rotatably mounted in a horizontal plane in the upper portion of said power plant housing, said regenerator including a pervious matrix with one portion thereof disposed transversely across the terminal portion of said diffuser, a fuel combustion chamber positioned within said housing at one side thereof in a vertical transverse plane closely adjacent said compressor rotor and said diffuser, said combustion chamber being adapted to utilize intake air supplied by said compressor rotor for supporting combustion of said fuel, the intake air for supporting combustion in said combustion chamber being caused to travel in a substantially spiral path while passing through said diffuser and said one regenerator matrix portion, internal wall structure in said housing defining a chamber below said one regenerator matrix portion for receiving said intake air, said combustion chamber being in communication with said chamber and including a burner tube for conducting gaseous combustion products in a generally downward direction toward said centrally mounted turbine elements, baffle means including portion adjacent the periphery of said first stage turbine element for introducing said combustion products into said turbine elements, said internal wall structure defining an annular gas passage means for conducting said combustion products through said turbine stage for powering the same, portions of said housing and said internal wall structure defining an exhaust chamber within said housing for receiving the exhaust gases from said turbine stages, said exhaust chamber being situated below another regenerator matrix portion, said exhaust gases being discharged through said other regenerator matrix portion, said internal wall structure being effective to separate the intake air for said combustion chamber from said turbine exhaust gases, the movement of the intake air from said compressor rotor to said combustion chamber and the movement of said combustion products to said first turbine element being substantially in a radial spiral direction with a minimum of axial movement.

4. A gas turbine power plant comprising a housing, a multiple stage turbine unit including first and second stage rotary turbine elements rotatably and centrally mounted within said housing, a compressor unit including a rotor rotatably mounted within said housing and drivably connected to said first stage turbine element, said rotor and said turbine elements being coaxially disposed, a volute diffuser formed in said housing about said rotor including air intake porting situated adjacent the periphery of said rotor, said volute diffuser having a terminal portion of relatively large cross sectional area disposed at a radially spaced location at the upper portion of said power plant, said terminal portion being defined by a removable cover secured to the top portion of said power plant, said cover forming a portion of said power plant housing, a circular rotary regenerator rotatably mounted in a horizontal plane in the upper portion of said power plant housing, said regenerator including a pervious matrix with one portion thereof disposed transversely across the terminal portion of said diffuser, a fuel combustion chamber positioned within said housing at one side thereof in a vertical transverse plane closely adjacent said compressor rotor and said diffuser, said combustion chamber being adapted to utilize intake air supplied by said compressor rotor for supporting combustion of said fuel, the intake air for supporting combustion in said combustion chamber being caused to travel in a substantially spiral path while passing through said diffuser and said one regenerator matrix portion, internal wall structure in said housing defining a chamber below said one regenerator matrix portion for receiving said intake air, said combustion chamber being in communication with said chamber and including a burner tube for conducting gaseous combustion products in a generally downward direction toward said centrally mounted turbine elements, baffle means including portion adjacent the periphery of said first stage turbine element for introducing said combustion products into said turbine elements, said internal wall structure defining an annular gas passage means for conducting said combustion products through said turbine stage for powering the same, portions of said housing and said internal wall structure defining an exhaust chamber within said housing for receiving the exhaust gases from said turbine stages, said exhaust chamber being situated below another regenerator matrix portion, said exhaust gases being discharged through said other regenerator matrix portion, said internal wall structure being effective to separate the intake air for said combustion chamber from said turbine exhaust gases, the movement of the intake air from said compressor rotor to said combustion chamber and the movement of said combustion products to said first turbine element being substantially in a radial spiral direction with a minimum of axial movement, said removable cover further defining portions of an exhaust passageway for conducting said exhaust gases from said power plant housing, the rotary regenerator matrix being accessible from the exterior of the power plant upon removal of said cover.

5. A gas turbine power plant comprising a housing, a turbine assembly rotatably mounted in said housing, a rotary compressor mounted in said housing coaxially with said turbine assembly and drivably connected thereto, a volute diffuser mounted in said housing coaxially about said compressor and having inlet porting adjacent the periphery of said compressor to receive inlet gases therefrom, said diffuser enlarging toward its terminal portion located adjacent a radially outer portion of said housing spaced radially from the common axis of said turbine assembly and compressor, a regenerator mounted in said outer portion and comprising a pervious rotary matrix having one portion arranged transversely across said terminal portion to receive said inlet gases upon discharge thereof from said terminal portion, the plane of rotation of said matrix being parallel to said axis, a fuel combustion chamber in said housing and offset radially from said axis in a plane transversely to said axis and closely adjacent said compressor and diffuser, baffle means in said housing having portions defining a space radially inwardly of said one matrix portion and communicating with said combustion chamber to conduct said inlet gases thereto from said one matrix portion, said baffle means having other portions in said housing defining a gas conducting chamber connecting said combustion chamber and the inlet end of said turbine assembly and extending in said plane transversely to said axis, said baffle means also comprising a gas passage effective to direct the gaseous combustion products axially through said turbine assembly and thence through a second portion of said matrix, and means for rotating said matrix.

6. The combination according to claim 5 wherein said turbine assembly comprises a multiple stage assembly, said compressor being drivably connected to the first stage of said multiple stage assembly, said gas conducting chamber extending from said combustion chamber and being spiralled toward said first stage, said baffle portions effective to direct the combustion products axially through said turbine assembly comprising an axial passage in communication with said spiralled gas conducting chamber to receive gases therefrom and being arranged to conduct said gases axially through the successive stages of said turbine assembly.

7. The combination according to claim 5 wherein said one matrix portion is spaced radially from the axis of said turbine assembly adjacent a plane transverse to said axis at said inlet end, and said second matrix portion is spaced radially from said axis adjacent a plane transverse to said axis at location endwise of said turbine assembly in the direction of axial gas flow through the latter.

8. The combination according to claim 5 wherein said terminal portion is defined by a removable cover secured to an outer portion of said power plant comprising a portion of said housing, said cover also defining a portion of a gas exhaust passage radially outwardly of said second matrix portion for conducting exhaust gases therefrom, said regenerator being accessible from the exterior of said power plant upon removing said cover.

9. The combination according to claim 5 wherein said space radially inwardly of said one matrix portion and communicating with said combustion chamber extends around said turbine assembly, said gas conducting chamber which connects said combustion chamber and turbine assembly comprises a radially inwardly directed burner portion terminating in a spiral portion, said spiral portion communicating with an axial inlet end of said turbine assembly and being located radially inwardly of said space which extends around said turbine assembly.

10. The combination according to claim 9 wherein said second matrix portion is spaced axially from said turbine assembly in the axial direction of gas flow through the latter, and wherein said one matrix portion is spaced axially from said second matrix portion in the axial direction toward the inlet end of said turbine assembly.

References Cited in the file of this patent

UNITED STATES PATENTS

| | | |
|---|---|---|
| 2,313,081 | Ljungström | Mar. 9, 1943 |
| 2,403,388 | Morey et al. | July 2, 1946 |
| 2,438,851 | Gates | Mar. 30, 1948 |
| 2,469,758 | Alcock | May 10, 1949 |
| 2,591,540 | Grylls | Apr. 1, 1952 |
| 2,625,012 | Larrecq | Jan. 13, 1953 |
| 2,631,427 | Rainbow | Mar. 17, 1953 |